July 18, 1967 D. R. HARTWIG 3,331,341
FERTILIZER DISTRIBUTOR
Original Filed Oct. 28, 1963 3 Sheets-Sheet 2
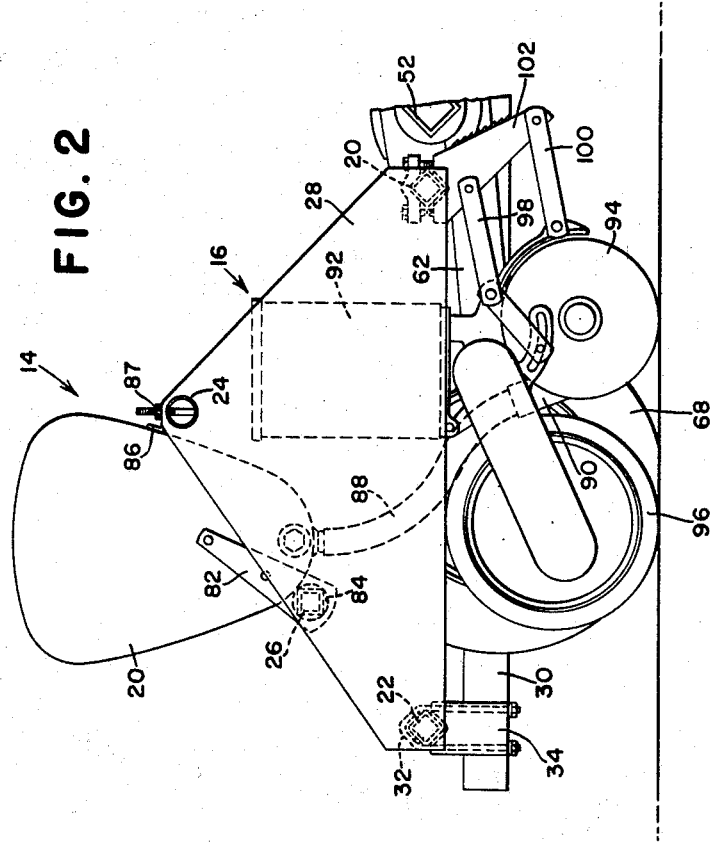
INVENTOR.
DONALD R. HARTWIG
BY
ATTORNEY

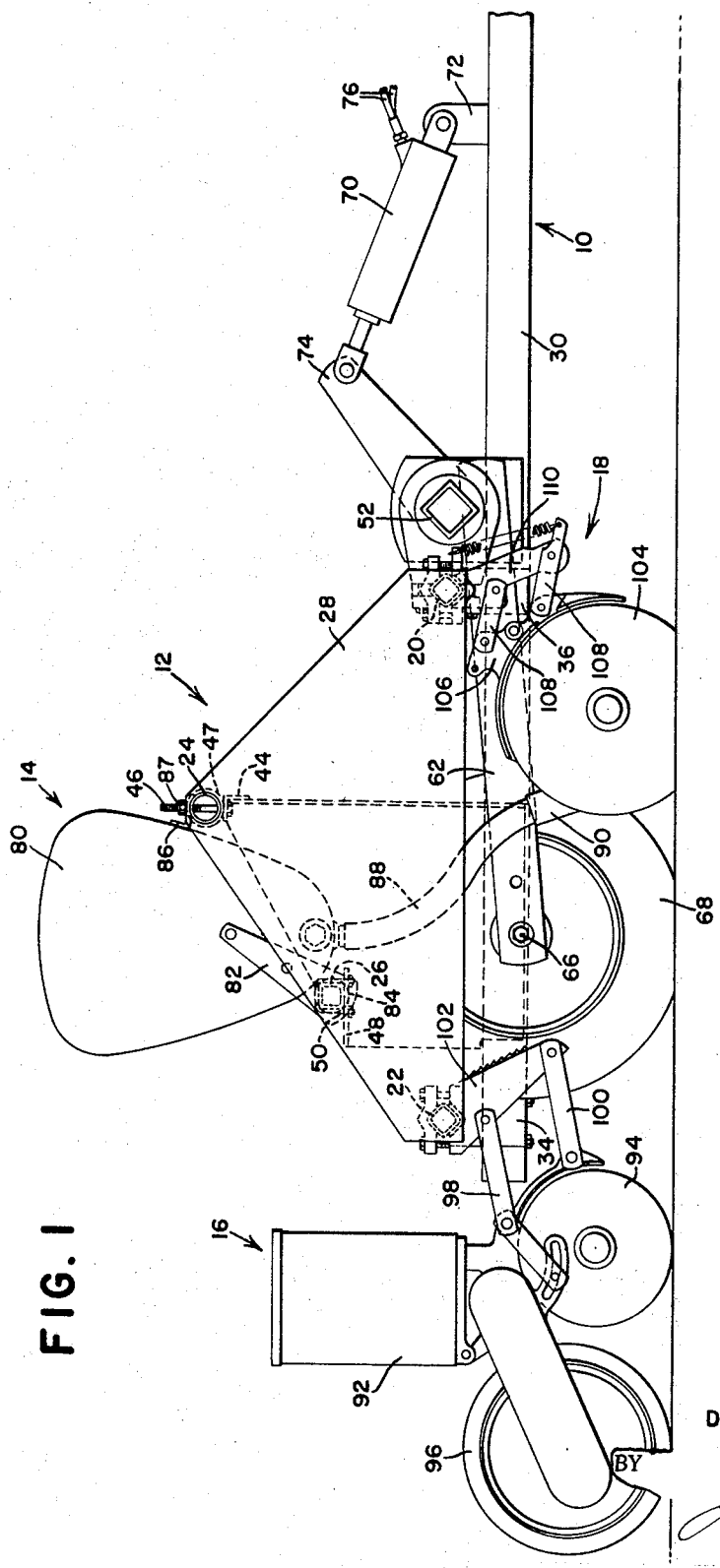

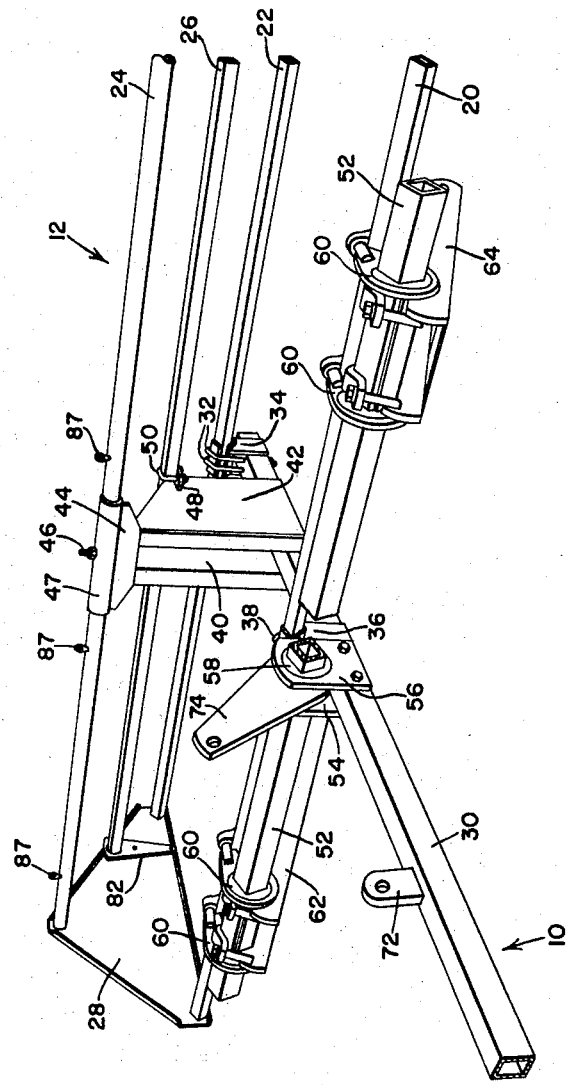

United States Patent Office 3,331,341
Patented July 18, 1967

3,331,341
FERTILIZER DISTRIBUTOR
Donald R. Hartwig, Rock Island, Ill., assignor to Deere & Company, Moline, Ill., a corporation of Delaware
Continuation of application Ser. No. 319,139, Oct. 28, 1963. This application Apr. 23, 1965, Ser. No. 453,545
11 Claims. (Cl. 111—73)

This application is a continuation of copending application Ser. No. 319,139, filed Oct. 28, 1963, now abandoned.

The present invention relates generally to agricultural implements, and more particularly to planting and fertilizing implements.

The object and general nature of the present invention is the provision of an implement which is adapted to carry fertilizer distributing means, and to which unit type planters may be secured in a variety of selected positions. More particularly it is an object of the present invention to provide an implement which is adapted to be drawn by a tractor, the implement having fertilizer distributing means supported thereon, and front and rear tool bars to which unit type planters, such as the type shown in U.S. Patent No. 3,022,754, may be selectively secured.

In implements of the general type herein disclosed the planting units have been permanently mounted either in front of the fertilizer distributor or to the rear of the fertilizer distributor. Therefore, since the fertilizer is placed in the ground directly vertically below (or nearly so) the bottom of the fertilizer dispenser, and since the fertilizer dispenser and planting units are in permanently fixed relationship, it has not been possible in the past to place fertilizer with respect to the seed in all desired relationships. Thus with a unit in which the planters are mounted in front of the fertilizer distributor it has not been possible in the past to place the fertilizer material below the seed; similarly, it has not been possible to place the seed below the distributed fertilizer material in units in which the planters are disposed behind the fertilizer dispensers.

An object of this invention is to provide a structure wherein the foregoing disadvantages of the prior art are overcome, and to this end it is an object to provide a structure wherein the planter units can be disposed in such a manner that the fertilizer and seed can be placed in any desired relationship. More specifically, it is an object to provide a structure to which a unit planter may be selectively mounted either in advance of a fertilizer dispenser, or behind a fertilizer dispenser.

Another object of the present invention is to provide a generally simplified frame construction for a fertilizer and planter unit, which is inexpensive to manufacture and relatively simple to assemble and use.

These and other objects and advantages of this invention will be apparent to those skilled in the art after a consideration of the following detailed description, taken in conjunction with the accompanying drawings in which the preferred form of this invention is illustrated.

FIG. 1 is a side view of an implement in which the principles of the present invention have been incorporated, the unit type planters being shown mounted to the rear of the fertilizer dispenser.

FIG. 2 is a somewhat schematic side view of a portion of the implement shown in FIG. 1, in which the unit planters have been mounted to the front of the fertilizer dispenser.

FIG. 3 is a perspective view of the draft frame and the supporting structure of this implement, the extreme left-hand portion of the supporting structure not being illustrated.

In the following description right-hand and left-hand reference is determined by standing to the rear of the implement and facing the direction of travel.

The fertilizer distributor and planter of the present invention, as best shown in FIG. 1, comprises a forwardly extending draft frame, indicated generally at 10, a transverse supporting structure 12, a fertilizer distributing mechanism 14 and unit planters 16. (In the preferred embodiment illustrated the transverse supporting structure is adapted to carry either four of six unit planters.) In addition the implement of the present invention may be provided with fertilizer openers 18 (FIG. 1) when the unit planters 16 are mounted to the rear of the fertilizer dispenser 14.

The transverse supporting structure includes front and rear tool bars 20 and 22, respectively, upper transverse frame means which includes a transverse pipe 24 and a transverse bar 26, and right- and left-hand triangularly shaped end members 28 (only one of which is shown), the end members having front and rear lower apical portions to which the front and rear tool bars 20 and 22 are rigidly secured, and an upper apical portion to which the pipe 24 and bar 26 are rigidly secured.

The draft frame 10 includes a principal draft bar 30 which is adapted to be secured to the drawbar of a conventional farm tractor in a manner well known in the art, the rear end of the draft bar being secured to the rear tool bar 22 by means of U-bolts 32 which cooperate with a saddle member 34 to hold the tool bar therebetween, the saddle member 34 being welded or otherwise secured to the rear end of the draft bar 30. An intermediate portion of the draft bar 30 is provided with a second saddle 36 to which the front tool bar is secured by means of U-bolts 38 (FIG. 3). Secured to bar 30 between the saddle members 34 and 36 are upstanding right- and left-hand plate members 40 and 42. An angle iron 44 is secured to the upper portion of the members 40 and 42, and a bolt 46 is passed through the angle iron 44 and the pipe 24 securing the pipe to the members 40 and 42. The pipe 24 is provided with a central reinforced portion 47 in the form of a second pipe closely spaced about the pipe 24. A transverse plate member 48 is secured to an upper rearward cut out portion of the members 40 and 42, as can best be seen in FIGS. 1 and 3, and U-bolts 50 are passed through the plate 48 and over the bar 26 securing the latter to the plate. Thus the front and rear tool bars 20 and 22, the pipe 24 and the bar 26 are rigidly secured to the draft frame 10.

A rock shaft 52 is rotatably supported centrally on the draft frame 10 and at its outer ends on the front tool bar 20. Right and left bearing supports 54 and 56 are mounted on the draft bar 30 in front of the saddle 36, the bearing supports having suitable bearings 58 which receive the central portion of the tool bar 52. Additional bearings and bearing supports 60 are mounted to the front tool bar 20 and carry outer end portions of the rock shaft 52. Secured to the right- and left-hand outer end portions of the rock shaft 52 are right- and left-hand bifurcated rock arms 62 and 64, each rock arm having an axle 66 (FIG. 1) which rotatably supports a ground-engaging wheel 68. An extensible and retractable device such as a hydraulic cylinder 70 is pivotally supported at its forward end to the upstanding lug 72 on the draft bar 30, and the rear portion of the cylinder 70 is pivotally connected to a rock arm 74, the other end of the rock arm 74 being rigidly secured to the rock shaft 52. The cylinder is connected through fluid lines 76 to a source of hydraulic fluid under pressure, and by extending or retracting the cylinder 70 in a conventional manner the ground wheels 68 can be caused to move up and down relative to the frame structure 12, thus causing the frame structure to move relative to the ground surface.

The fertilizer distributor 14 includes a fertilizer dispenser 80 which is mounted on the pipe 24 and the bar 26 in a manner similar to that shown in Patent No. 2,906,436 to W. P. Oehler et al., issued Sept. 29, 1959, the fertilizer dispenser being rigidly secured at either end to arms 82, each arm being provided with a large aperture 84 at its lower end which is disposed about the bar 26 in such a manner that the arms can rotate about the bar 26. The upper forward wall of the fertilizer dispenser 80 is secured to the bar 24 by means of conventional releasable fastener means which may include an angled plate 86 and pin means 87. The fertilizer distributor also includes a hose 88 and a spout 90, fertilizer material being adapted to be distributed through the hose and spout onto the ground. It should be noted that the hose 88 should be relatively vertical since if it were disposed somewhat horizontally, fertilizer material would not flow freely through the hose. Thus the hopper is generally disposed almost directly above the discharge point of the spout 90.

Unit planters preferably of the type shown in U.S. Patent No. 3,022,754 to Sorensen et al., issued Feb. 27, 1962, are adapted to be secured to either the front or the rear tool bars, 20 and 22, respectively. Each unit planter includes a conventional seed can or hopper and distributing means 92, a furrow opener 94, a press wheel 96 which is adapted to drive the seed distributing means in the manner fully set forth in the above-mentioned patent, and upper and lower parallel links 98 and 100, respectively, which are secured to a mounting bracket 102.

In operation when it is desired to place the fertilizer with the seed, the unit planters 16 are mounted on the front tool bar 20 in the manner indicated in FIG. 2. To this end it should be noted that sufficient clearance is provided between the fertilizer dispenser 80 and the tool bar 20 to provide sufficient clearance for the unit planters 16. In this position the spout 90 and hoses 88 are generally directly below the bottom of the dispenser and are adapted to distribute fertilizer material in the furrow opened by the furrow openers 94. Thus the fertilizer material is deposited with the seed distributed through the distributing means 92 of the unit planters 16.

When it is desired to place the fertilizer either to one side or below the seed it is necessary to distribute the fertilizer in advance of the seed. To this end the unit planters are mounted on the rear tool bar 22 in the manner shown in FIG. 1, and fertilizer openers 18 are mounted on the front tool bar 20. The fertilizer openers are generally conventional and can be of the double disk type illustrated in the drawings, the disks 104 being mounted on a boot 106 which is carried by parallel links 108 secured to a mounting bracket 110, the mounting bracket being in turn secured to the tool bar 20 in a conventional manner. Thus it should be evident that when the implement of this invention is arranged in the manner indicated in FIG. 1 fertilizer material can be placed directly in the ground in the furrow opened by the opener 18 and that seed distributed by the unit planter 16 can be planted to one side of the distributed fertilizer. If it is desired to plant the seed above the fertilizer, it is desirable to employ covering arms such as the type shown in the above-referred to Sorensen patent, the seed being planted in the earth that is deposited over the distributed fertilizer material by the covering arms.

While I have shown and described above the preferred structure in which the principles of the present invention have been incorporated, it is to be understood that my invention is not to be limited to the particular details, shown, and described above, but that, in fact, widely different means may be employed in the practice of the broader aspects of my invention.

I claim:

1. An apparatus to carry fertilizer distributing means and to which unit planters may be secured, said apparatus comprising: front and rear transversely extending unit planter receiving tool bars, transversely extending frame means disposed above and between said tool bars, generally triangularly shaped longitudinally extending opposed end plates interconnecting all of said tool bars and said frame means, said interconnecting means holding said bars and said frame means in rigid spaced apart relationship, and fertilizer distributing means carried by said frame means, said fertilizer distributing means and said frame means being so spaced relative to said front tool bar that a unit planter may be secured to the front tool bar without engaging the fertilizer distributing means and the frame means, said fertilizer distributor being adapted to place fertilizer directly with the seed when the unit planter is mounted on the front tool bar, and said fertilizer distributor and said frame means being so spaced relative to said rear tool bar that a unit planter may be secured to the rear tool bar without engaging the fertilizer distributing means and the frame means, said unit planter being adapted to place the seed either to one side or above the distributed fertilizer material when the unit planter is mounted on the rear tool bar.

2. An apparatus adapted to carry fertilizer distributing means and to which unit planters may be secured, said apparatus comprising: front and rear transversely extending tool bars to which unit planters may be selectively secured, generally triangularly shaped spaced apart end members, each of said members having front and rear lower apical portions and a generally centrally located upper apical portion, said front and rear tool bars being rigidly secured to said front and rear lower apical portions, transversely extending frame means extending between said end members and secured generally to the central apical portion, fertilizer distributing means carried by said frame means, the fertilizer distributing means and said frame means being so located with respect to the tool bars that unit planters may be mounted on either tool bar without engaging the fertilizer distributor and frame means.

3. A planting and fertilizing apparatus comprising: front and rear transversely extending tool bars, generally triangularly shaped spaced apart end members, each of said members having front and rear lower apical portions and a generally centrally located upper apical portion, said front and rear tool bars being rigidly secured to said front and rear lower apical portions, transversely extending frame means extending between said end members and secured to the central apical portion of said end members, fertilizer dispensing means carried solely by said frame means, fertilizer opener means carried by the front tool bar, hose and spout means connected at their upper end with the fertilizer distributing means and disposed at its lower end behind and adjacent to said fertilizer opener means, and unit planter means secured to said rear tool bar and adapted to cooperate with said fertilizer openers whereby seed may be planted either above or to one side of the distributed fertilizer.

4. A planting and fertilizing apparatus comprising: front and rear transversely extending tool bars, generally triangularly shaped spaced apart end members, each of said members having front and rear lower apical portions and a generally centrally located upper apical portion, said front and rear tool bars being rigidly secured to said front and rear lower apical portions respectively, transversely extending frame means extending between said end members and secured to the central apical portion of said end members, fertilizer distributing means carried solely by said frame means, unit planter means secured to said front tool bar, said unit planter means including opener means, seed distributing means, and press wheel means, and hose and spout means connected at its upper end with the fertilizer distributing means and disposed at its lower end behind said planter opener means, whereby said distributed fertilizer may be placed directly with the seed.

5. An apparatus adapted to carry fertilizer distributing means and to which unit planters may be secured, said apparatus comprising: front and rear transversely extending tool bars to which unit planters may be selectively secured, transversely extending frame means disposed between and above said tool bars, fertilizer distributing means carried by said frame means, a forwardly extending draft frame secured at its rear end to an intermediate portion of said rear tool bar and at an intermediate portion to an intermediate portion of said front tool bar, a transversely extending rock shaft rotatably secured to an intermediate portion of said draft frame, said rock shaft having rigidly secured thereto rearwardly projecting rock arm means, ground-engaging wheel means rotatably mounted on said arm means, an upright frame secured to the draft frame between said front and rear tool bars, said transversely extending frame means being rigidly secured at an intermediate point to said upright frame, and right- and left-hand longitudinally extending end plates rigidly interconnecting the right- and left-hand ends of said tool bars and said frame means.

6. A planting and fertilizing implement comprising: a transversely extending frame means, fertilizer distributing means carried by said frame means, a first transversely extending unit planter receiving tool bar disposed forwardly and below said frame means, a second transversely extending unit planter receiving tool bar disposed rearwardly and below said frame means, means interconnecting the end portions of said first and second tool bars and said frame means and holding them in rigid spaced apart relationship, said first and second tool bars being so spaced relative to said frame means and said fertilizer distributing means that unit planters may be secured thereto without engaging said frame means and said fertilizer distributing means, and unit planters mounted on only one of said tool bars, each of said unit planters including a seed hopper and distributing means, a furrow opener, and a press wheel.

7. A planting and fertilizing implement comprising: a transversely extending frame means, fertilizer distributing means carried by said frame means, first transversely extending unit planter receiving means disposed forwardly and below said frame means, second transversely extending unit planter receiving means disposed rearwardly and below said frame means, means interconnecting said first and second receiving means and said frame means and holding them in rigid spaced apart relationship, said interconnecting means including generally triangularly shaped spaced apart end members, each of said end members having front and rear lower apical portions and a generally centrally located upper apical portion, said first and second receiving means extending between said end members and being rigidly secured to said front and rear lower apical portions, and said transversely extending frame means extending between said end members and being secured generally to said central apical portion, said first and second receiving means being so spaced relative to said frame means and said fertilizer distributing means that unit planters may be secured thereto without engaging said last-mentioned means, and unit planters mounted on only one of said one receiving means.

8. A planting and fertilizing apparatus comprising: front and rear transversely extending tool bars, spaced apart end structures having front and rear lower portions and a generally centrally located upper portion, said front and rear tool bars being secured to said front and rear lower portions, vertically spaced transversely extending frame means extending between said end structures and secured to a central portion of said end structures, fertilizer dispensing means secured to said frame means, fertilizer opener means carried by the front tool bar, hose and spout means connected at their upper end with the fertilizer distributing means and disposed at its lower end behind and adjacent to said fertilizer opener means, and unit planter means secured to said rear tool bar and adapted to cooperate with said fertilizer openers whereby seed may be planted either above or to one side of the distributed fertilizer.

9. A planting and fertilizing apparatus comprising: front and rear transversely extending tool bars, spaced apart longitudinally extending end plates having front and rear lower portions, each plate having an upper edge extending from the front portion upwardly and rearwardly to an intermediate upper portion and from thence downwardly and rearwardly to the rear lower portion, said front and rear tool bars being rigidly secured to said front and rear lower portions, vertically spaced upper and lower transversely extending frame members extending between said end plates secured to a central portion of the end plates with the upper of the frame members extending between the plate upper portions, transverse fertilizer tank means carried by said frame members and having a front side connected to the upper of the frame members and an underside carried by the lower frame member, ground opener means rearwardly of and suspended by the front tool bar to yield vertically in accordance with the ground level, hose and spout means extending from an upper end opening into the fertilizer tank means to a lower outlet end behind and adjacent to said fertilizer opener means, and unit planter means secured to said rear tool bar and adapted to cooperate with said fertilizer openers whereby seed may be planted either above or to one side of the distributed fertilizer.

10. A planting and fertilizing apparatus comprising: a forwardly extending draft frame, a front transversely extending tool bar rigidly interconnected to an intermediate portion of said draft frame, a rear transversely extending tool bar rigidly interconnected to the rear of said draft frame, said draft frame being provided with upwardly extending means, first transversely extending fertilizer dispenser support means secured to an upper portion of the upwardly extending means, spaced apart end structures secured to the ends of said tool bars and said transversely extending fertilizer dispenser support means, second transversely extending fertilizer dispenser support means disposed between said tool bars and having its end secured to said spaced apart end structures, fertilizer dispenser means mounted on said first and second fertilizer dispenser support means, fertilizer opener means carried by the front tool bar, hose and spout means connected at their upper end with the fertilizer distributor means and disposed at its lower end behind and adjacent to said fertilizer opener means, and unit planter means secured to said rear tool bar and adapted to cooperate with said fertilizer openers whereby seed may be planted either above or to one side of the distributer fertilizer.

11. A planting and fertilizing apparatus comprising: front and rear transversely extending tool bars, spaced apart end structures having front and rear lower portions and a generally centrally located upper portion, said front and rear tool bars being secured to said front and rear lower portions, vertically spaced transversely extending frame means extending between said end structures and secured to a central portion of said end structures, fertilizer dispensing means secured to said frame means, unit planter means secured to said front tool bar, said unit planter means including opener means, seed distributing means, and press wheel means, and hose and spout means connected at its upper end with the fertilizer distributing means and disposed at its lower end behind said planter opener means, whereby said distributed fertilizer may be placed directly with the seed.

References Cited

UNITED STATES PATENTS 2,637,564  5/1953  Stratman _____ 172—413 X
3,059,705  10/1962  Oehler et al. _____ 111—52 X

FOREIGN PATENTS 578,481  6/1959  Canada.
662,349  12/1951  Great Britain.

ABRAHAM G. STONE, *Primary Examiner.*

J. R. OAKS, *Assistant Examiner.*